(12) United States Patent
Karpisek

(10) Patent No.: US 6,196,784 B1
(45) Date of Patent: Mar. 6, 2001

(54) APPARATUS FOR INVERTING CONTAINER MEANS

(76) Inventor: Ladislav Stephan Karpisek, 86 Woodfield Boulevarde, 2229, Caringbah, New South Wales (AU)

(*) Notice: Subject to any disclaimer, the term of this patent is extended or adjusted under 35 U.S.C. 154(b) by 0 days.

(21) Appl. No.: 09/254,327
(22) PCT Filed: Sep. 10, 1997
(86) PCT No.: PCT/AU97/00592
§ 371 Date: Mar. 4, 1999
§ 102(e) Date: Mar. 4, 1999
(87) PCT Pub. No.: WO98/11008
PCT Pub. Date: Mar. 19, 1998

(30) Foreign Application Priority Data

Sep. 11, 1996 (AU) ................................ PO2251

(51) Int. Cl.⁷ .................................................. B65G 65/23
(52) U.S. Cl. ............................................................. 414/421
(58) Field of Search ...................................... 414/419, 421

(56) References Cited

U.S. PATENT DOCUMENTS 3,137,327 * 6/1964 Muench .......................... 414/419 X
3,777,920 * 12/1973 Wiese .................................. 414/421
4,744,701 * 5/1988 Chasteen .......................... 414/421 X

* cited by examiner

Primary Examiner—Steven A. Bratlie
(74) Attorney, Agent, or Firm—Edwin D. Schindler

(57) ABSTRACT

An inverting apparatus (1) for a container means (20/21), the apparatus includes a pivotally mounted cradle (2) with an open side to allow a container means to be entered into a receiving zone of said cradle (2), the receiving zone is defined by two spaced apart oppositely disposed cradle sides, a cradle back opposite said open side and two cradle ends (15/16), at one end (16) there is a foot plate (17) which is linearly movable towards and away from the other cradle end (15).

7 Claims, 6 Drawing Sheets

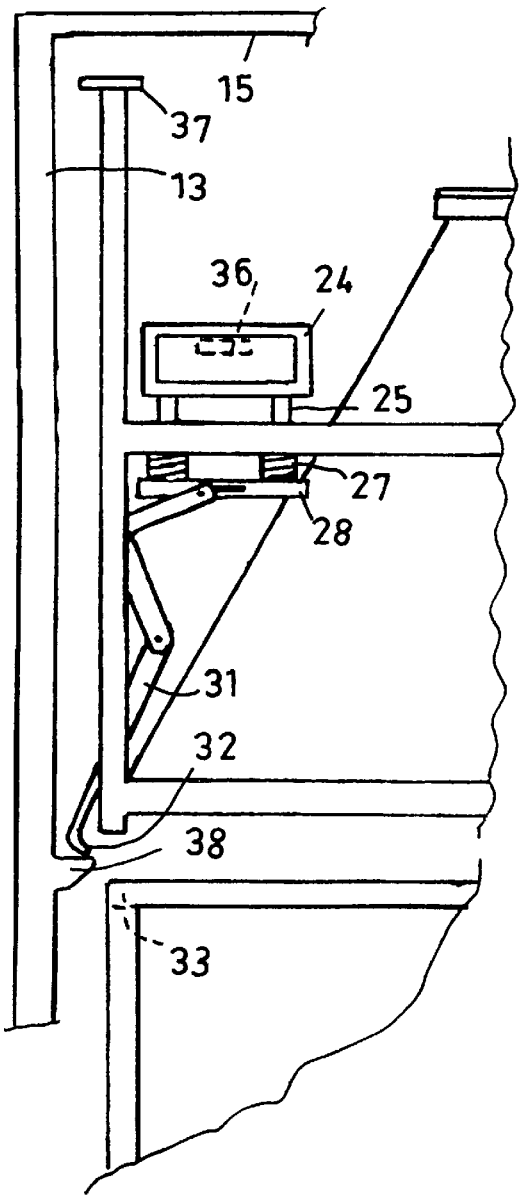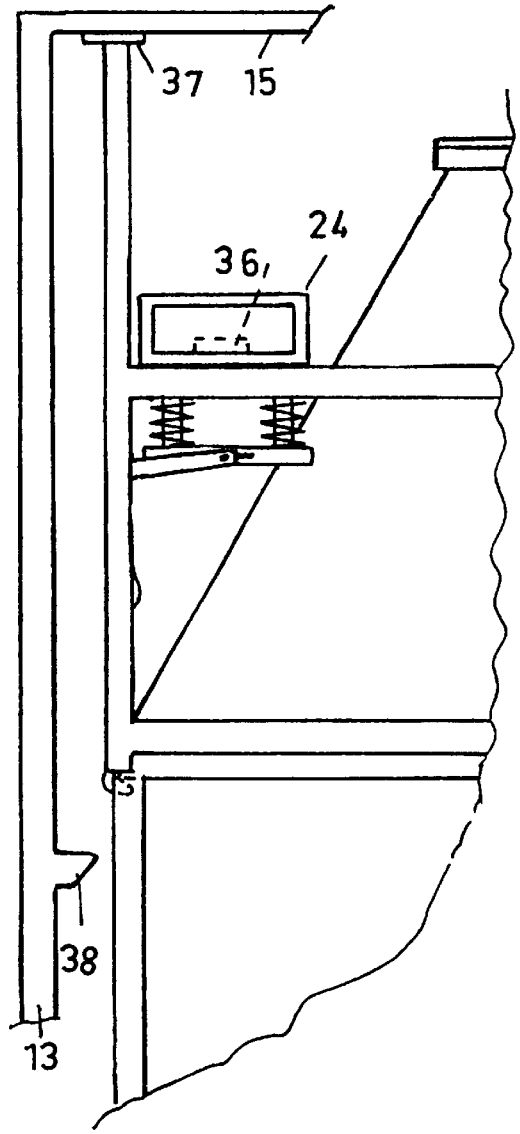
FIG. 11.
FIG. 12.

APPARATUS FOR INVERTING CONTAINER MEANS

FIELD OF THE INVENTION

This invention is concerned generally with emptying containers and particularly with placing containers in a state of readiness for emptying.

This invention has been devised with containers in mind which include a pallet or base with four upstanding interlocked sides. While the invention has been devised with the above form of container particularly in mind it is not limited to such containers.

BACKGROUND TO THE INVENTION

When containers have to be emptied the methods adopted depend to a large extent on the contents of the container. In the case of flowable material, such as granules, gravitational discharge it the preferred option. To facilitate this form of emptying a container attempts have been made to develop containers which have a bottom discharge means. For a number of reasons containers with a bottom discharge incorporated in a base or pallet forming part of the container have not found favor with users.

An alternative is to tilt the container, usually in a tilting device on which the container is mounted, to the extent required to cause the contents to flow from the container over a top edge of one of the container sides. To provide a generally uniform rate of discharge, which is the normal requirement, the tilt of the container has to be continually adjusted. This discharge method is labor and/or time intensive and is therefore not favor.

Another discharge method is to mount a hood with a discharge opening fitted with a flow controlling device to the open top of the container and then support the container in an inverted condition to allow material in the container to gravity discharge through the discharge opening of the hood. The challenge with this method is how to invert the container and support it in the inverted manner in the most efficient and economical manner. The present invention addresses this challenge.

GENERAL DESCRIPTION OF THE INVENTION

Generally, the invention can be said to provide an inverting apparatus for a container means, said inverter includes a cradle pivotally mounted on a frame and pivotally movable by cradle moving means, said cradle has an open side to allow a container means to be entered into a receiving zone of said cradle, said receiving zone is defined by two spaced apart oppositely disposed cradle sides, a cradle back opposite said open side and two cradle ends at least one of which is linearly movable towards and away from the other cradle end to adopt retracted and extended conditions respectively.

BRIEF DESCRIPTION OF THE DRAWINGS

FIG. 11 is an enlarged fragmentary view of a hood, as shown in FIGS. 8 and 9, supported in the inverter ready for coupling to a container, and FIG. 12 is a view similar to FIG. 11, showing a container coupled to the hood.

DETAILED DESCRIPTION OF THE DRAWINGS

Figure 1:
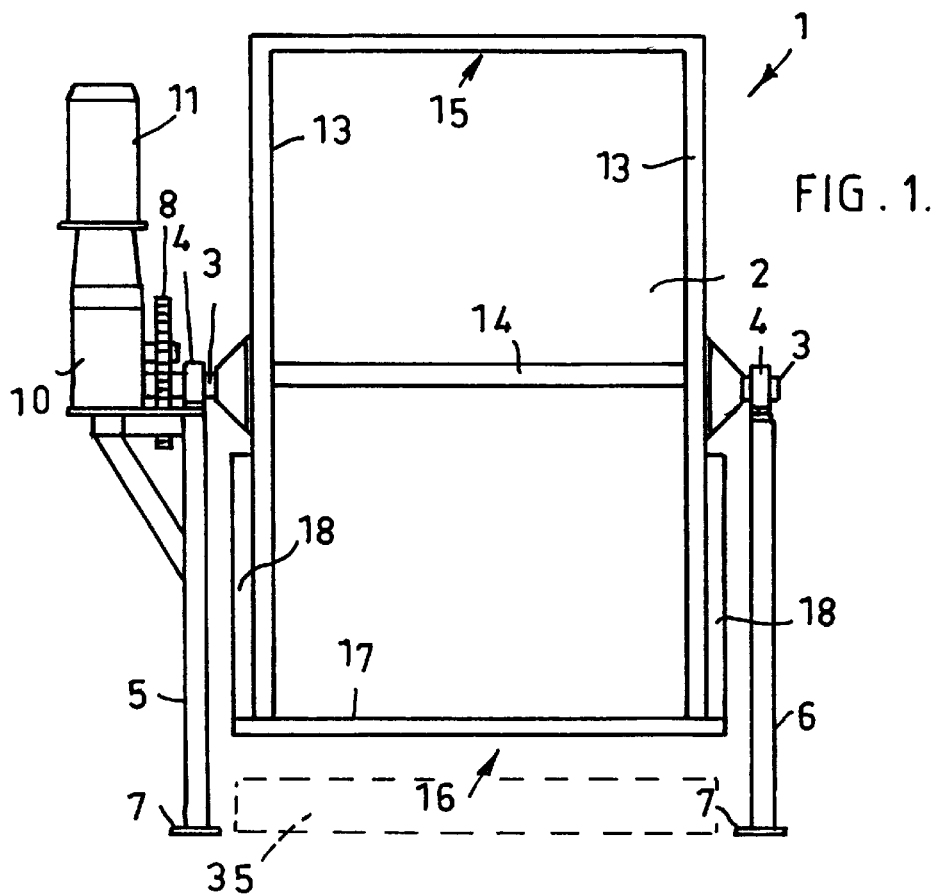
FIG. 1 is a front view of a container inverter according to the present invention, when in a closed container retaining condition.

In FIG. 1 the tilter assembly 1 includes a cradle 2 supported through stub axles 3 in bearings 4 on frames 5 and 6 with floor engaging feet 7. As illustrated there is a chain 8 connecting a driving sprocket 9 of a power unit 10 driven by an electric motor 11, to a sprocket 12 fixed to one of the stub axles 3. By suitable control means the power unit 10 can be used to rotate the cradle 2 through 180 degrees in the direction of arrow A from the position illustrated in FIG. 2 and then return the cradle in the direction of the arrow B to the FIGS. 1 and 2 condition.

Figure 2:
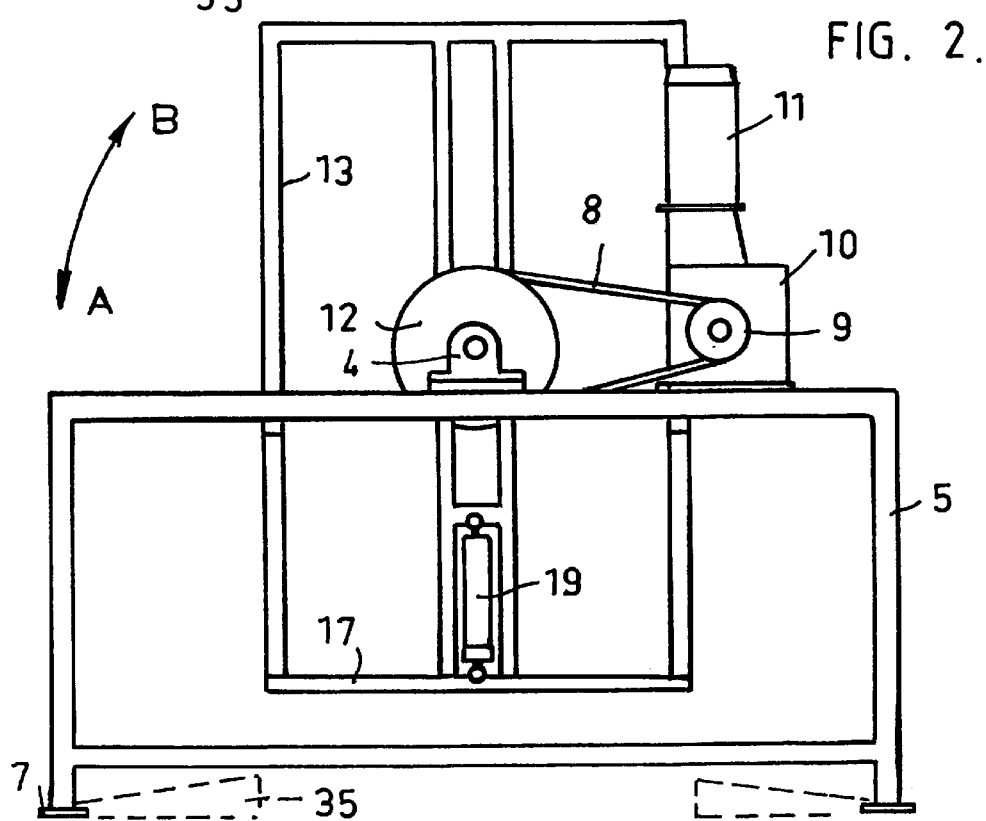
FIG. 2 is a side view of the inverter of FIG. 1.
Figure 3:
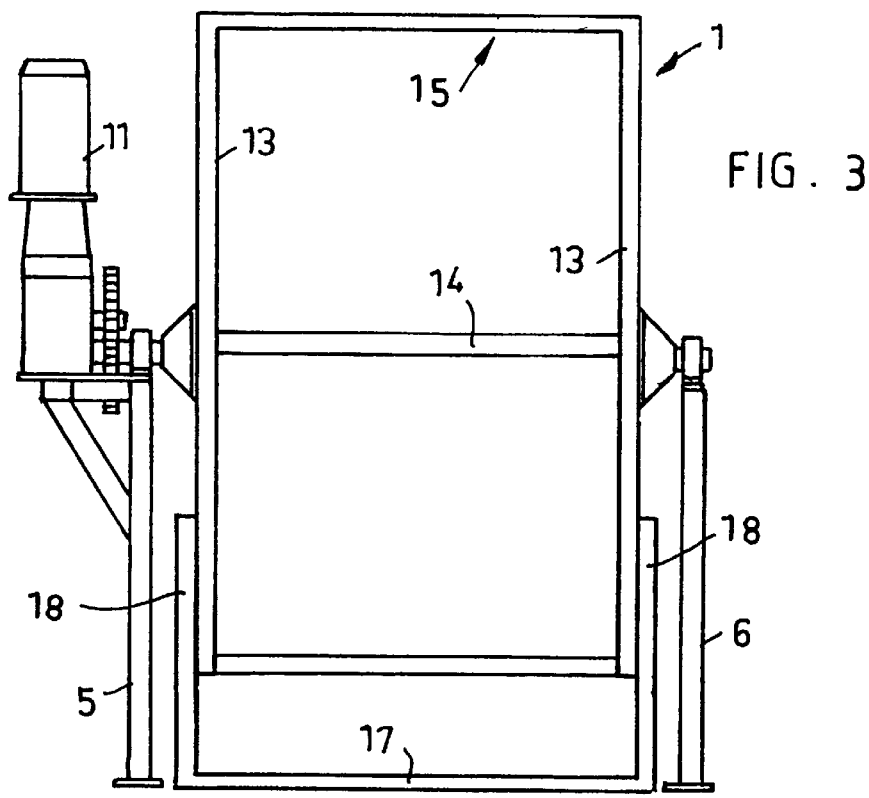
FIG. 3 is a front view of the inverter of FIG. 1 in an open container loading and unloading condition.
Figure 4:
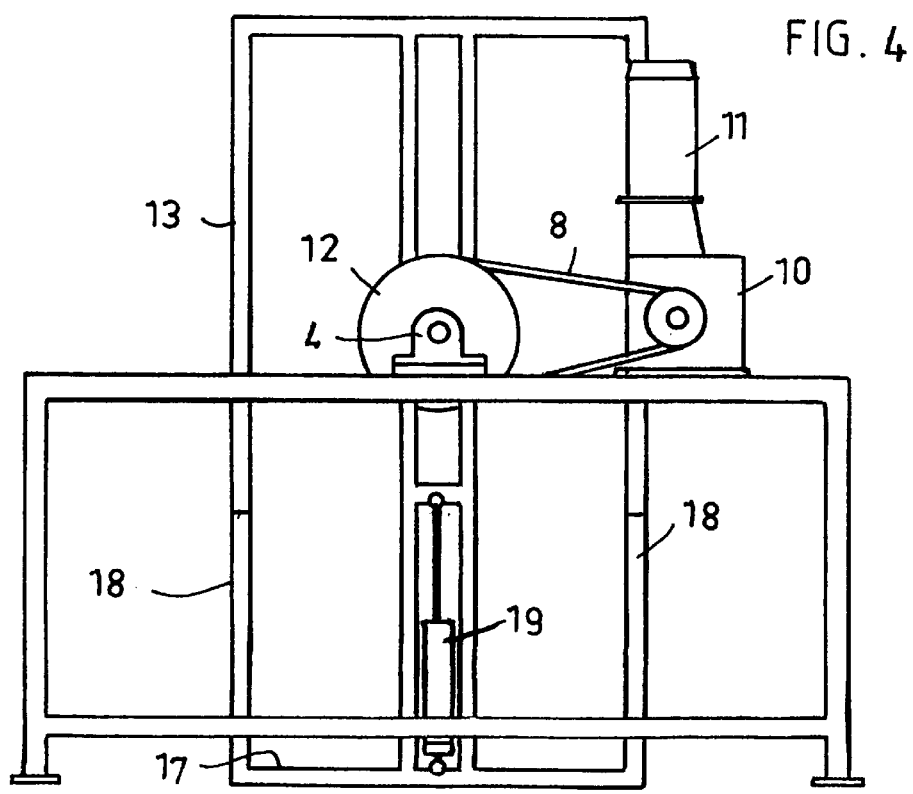
FIG. 4 is a side view of the inverter of FIG. 3.

The cradle 2 includes a frame made up longitudinal members 13 and lateral members 14 providing a channel shaped trough with two parallel sides and a channel base opposite the open side of the channel, a fixed end 15 and a movable end assembly 16. The end assembly 16 includes a foot plate 17 mounted on the frame members 13 in a manner allowing the foot plate 17 to be moved linearly towards and away from the cradle end 15 between a lowered condition shown in FIGS. 3 and 4 and a raised condition as shown in FIGS. 1 and 2. The connection between the foot plate 17 to the cradle frame members 13 can be any one of a number of suitable telescopic-type connections. An example would be to have wheels on the uprights 18 of the foot plate 17 engaged in tracks in the frame members 13.

Hydraulic piston and cylinder assemblies 19 (see FIG. 2) are provided on opposite sides of the cradle to move the foot plate 17 relative to the cradle frame members 13.

Figure 7:
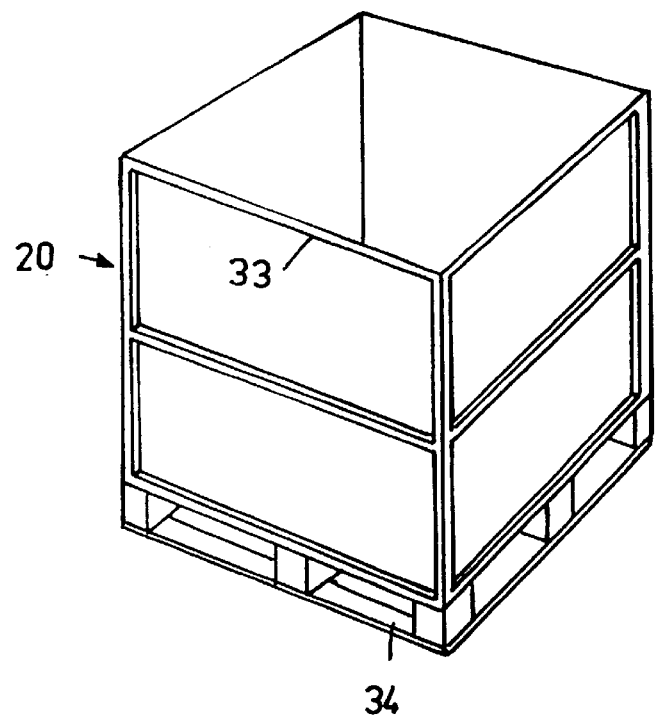
FIG. 7 is a schematic perspective view of a container of the type suitable for loading into the inverter.
Figure 8:
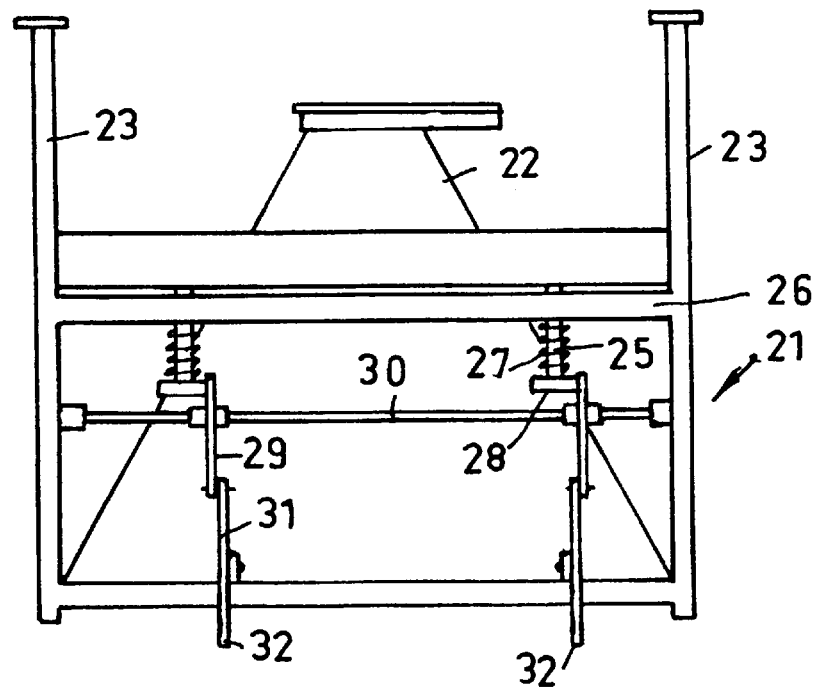
FIG. 8 is a side elevation of a hood adapted for automatic coupling to a container as shown in FIG. 7.
Figure 9:
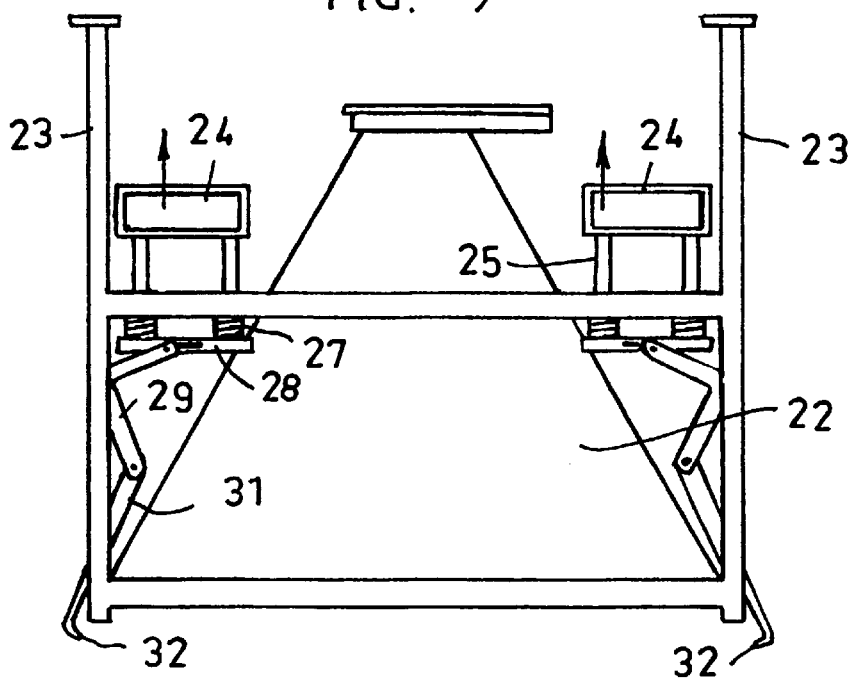
FIG. 9 is a front view of the hood of FIG. 8 showing container coupling means in a release condition.

The tilter has been devised with a specific form of container assembly in mind. That container 20 of the assembly is shown in schematic form in FIG. 7 and a hood 21 for mounting on the container 20 can be of the simple form shown in FIGS. 5 and 6, where the hood is clamped in a suitable manner to the container 20, or it can be of a self-latching-type, as shown in FIGS. 8 and 9. The hood 21 in both forms includes a discharge funnel 22 disposed within an arrangement of ground engaging legs 23 between which tubular members 24 are provided to receive fork lift truck tines.

In the hood 21 illustrated in FIGS. 8 and 9 the fork lift tine engaging members 24 are coupled through posts 25 to tie members members 26 connecting the hood legs 23 and are biassed into engagement with the tie members 26 by springs 27. Post stop ends 28 are connected through lever arms 29, mounted on shafts 30, to pivotally mounted arms 31 provided with hook ends 32. The hooked ends 32 are adapted to engage co-operating portions of the container 20 at the open top thereof. In one arrangement the hook ends 32 engaged under upper bars 33 of the frames of the container sides It follows that by raising the members 24 relative to the frame of the hood 21 by means of fork lift truck tines (see FIG. 9) the hooked ends 32 of the arms 31 would be moved to a container release condition shown in FIG. 9. When the hood was lowered onto a container and the fork lift tines were removed from the members 24 the springs 27 would cause the hook ends 32 to move to container engaging positions. This arrangement is fully disclosed in the U.S. Pat. No. 5,971,219.

Figure 5:
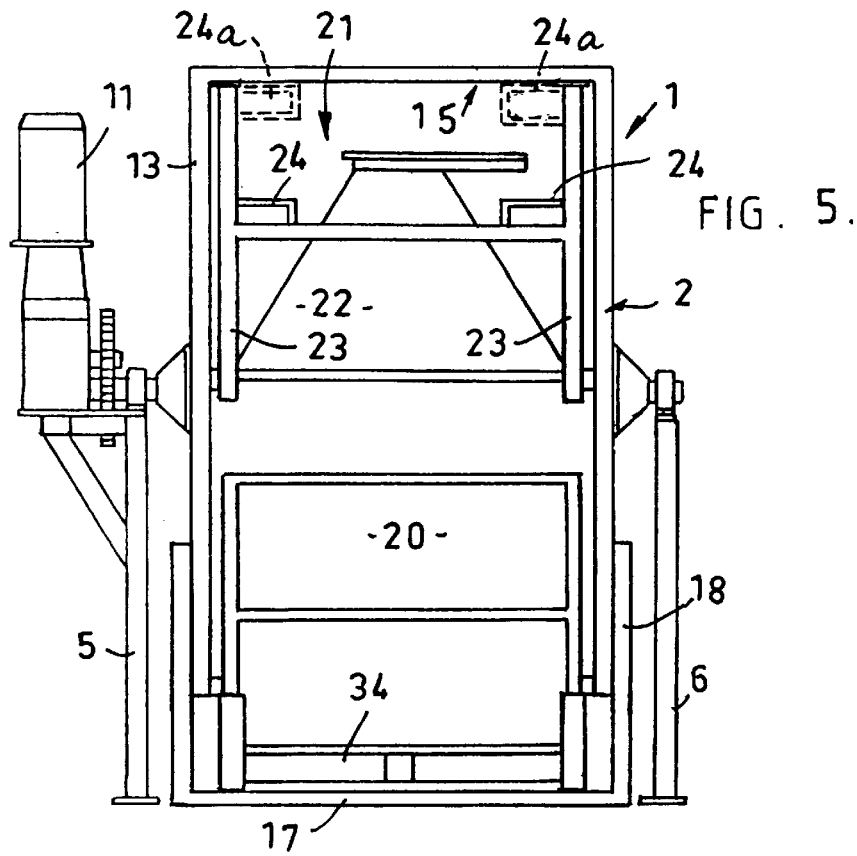
FIG. 5 is a front view similar to FIG. 3 with a container loaded into the inverter and separated from a container hood which is supported in the inverter.
Figure 6:
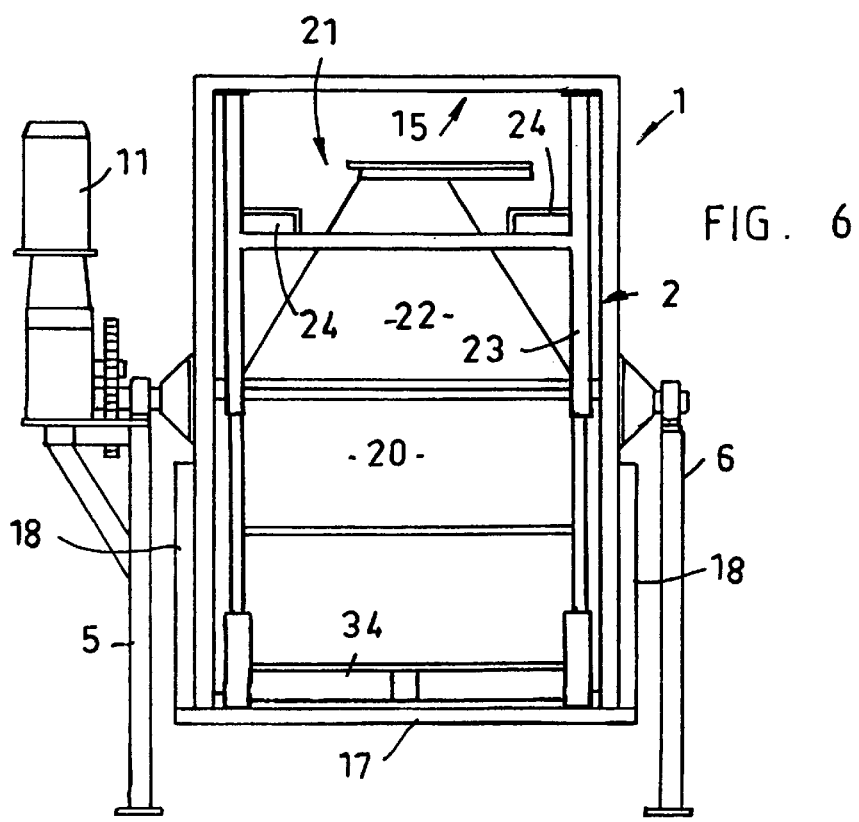
FIG. 6 is a view similar to FIG. 1 following elevation of the container shown in FIG. 5 and coupling to the hood in the inverter, and as it would appear if a container/hood assembly had been loaded into the inverter and elevated.

In a first mode of use of the inverter, a simple hood 21 as shown in FIGS. 5 and 6 or the self-latching-type of FIGS. 8 and 9 would be fitted to the open top of a container and the assembly would be put into the cradle through an open side thereof to rest on a lowered foot plate 17. This would be achieved by engaging the fork lift tines with the pallet type base 34 of the container 20.

The foot plate 17 would then be raised by the piston and cylinder units 19 to secure the container/hood assembly between the tilter ends 15 and 16 thereby substantially preventing endwise movement of the container/hood assembly during the inversion thereof. Suitable retaining means would normally be provided to retain the tilter foot plate 17 in the retracted condition so as to not rely on the lifting and lowering means 19 to retain the foot plate in the retracted condition during cradle inversion.

Figure 10:
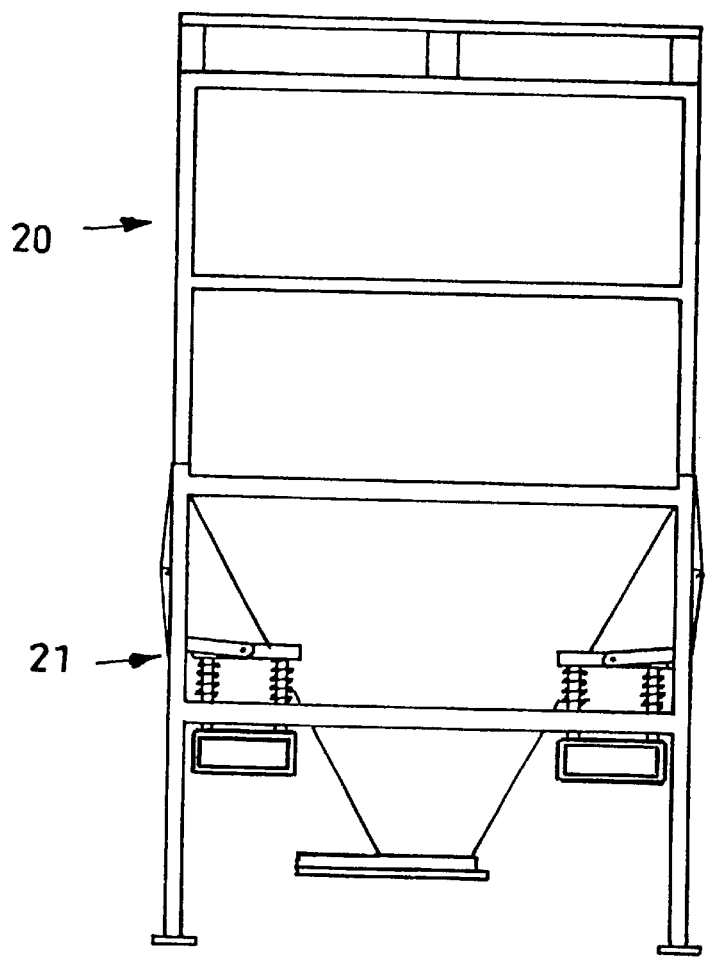
FIG. 10 is a front view of a container as shown in FIG. 7, fitted with the hood of FIGS. 8 and 9, and inverted ready for discharge through the hood.

After inversion of the container/hood assembly (movement arrow A), the container assembly would be in the orientation of FIG. 10. The foot plate 17 would be moved (raised) to an extended condition to allow the container/hood assembly to be freely removed from the cradle by a fork lift truck with the tines engaged in the hood members 24.

Thereafter the cradle 2 would be returned to its original position (movement arrow B), ready for another inversion cycle.

As will be understood the foot plate 17 can be provided at both ends of the cradle and the cradle could be associated with a ramped floor zone, see the dotted outline of ramps indicated 35 in FIGS. 1 and 2. With such an arrangement the hood 21 would be provided with a modified ground engaging portion complete with fork lift truck tine sleeves shown in broken lines in FIG. 5 and indicated 24a. Using a ramp as illustrated the container/hood assembly can be handled by a hand truck making it unnecessary to use a fork lift truck to load the container assembly into the cradle and remove it from the cradle.

In a variation of the foregoing, the hood 21 could be retained in the cradle 2 and would be automatically coupled to a container 20 and uncoupled therefrom, thereby avoiding the need to perform those operations externally of the tilter by means of a fork lift truck and thereby save time and effort.

The hood 21 for such use would be of the type shown in FIGS. 8 and 9. There would be a pair of spigots 36 fixed to the bottom of the cradle channel aligned with the members 24 of the hood 2 and lying adjacent the lower inner faces of the members 24 when in the position shown in FIG. 11 with the feet 37 of the hood legs 23 engaged with the cradle end 15.

In an initial hood set-up operation the hood 21 would be placed in the cradle upper zone, as shown in FIG. 12 with the spigots 36 entered into the leading ends of the tine engaged members 24, initially in approximately a mid-height position within the members 24. As will be understood the springs 27 will be compressed due to the down load exerted by the weight of the hood as it is lifted by tines in the members 24. The linkages will be operated so the hooks 32 will adopt the illustrated release condition. The hood 21 would then be lowered until the hook ends 32 of the members 31 bear on bars 38 fixed to the cradle members 13. The cradle is supported in this manner after the removal of the fork lift tines from the members 24. When the hood is so supported the spigots 36 lie closely adjacent the upper inner faces of the members 24, see FIG. 12.

A container would then be placed in the lower zone of the cradle on a lowered foot plate 17. The foot plate 17 would then be raised and the container 20 would be raised. Because the hooks 32 are 'open' the top of the container 20 can come into contact with the lower end of the hood frame. As the container 20 is raised further the hood 21 will be raised relative to the spigots 36, which were holding the members 24 raised and the linkages in a condition in which the hooks maintained the 'open' condition. The raising of the hood relative to the spigots allows the springs 27 to move the linkages with the result that the hooked ends 32 move inwardly and engage under the top bars 33 of the frames of the sides of the container 20, thereby locking the hood to the container. When the feet 37 of the hood legs engage the cradle end 15 the spigots 36 will lie adjacent the lower inner faces of the members 24, see FIG. 11.

The inverter is pivoted to invert the container/hood assembly. The assembly is removed from the inverted cradle after release by the foot plate 17, or a counterpart foot plate at the end 15 of the cradle, by means of a fork lift truck engaged with the members 24, as before described. Alternatively, a hand truck can be used to remove the assembly with the hand truck engaging the modified foot section of the hood, as before described.

After emptying the container/hood assembly would be replaced in the cradle, using a form lift truck or hand truck, the assembly would be secured in the cradle, as before described, and inverted to the FIG. 6 configuration. After inversion of the cradle the foot plate 17 would be released and lowered. The lowering of the container/hood assembly brings the upper inner faces of the members 24 into engagement with the spigots 36, the linkage of the hood would be actuated to release the hooked ends 32 (see FIG. 12) from the container. Further lowering of the container 20 will result in the FIG. 5 configuration allowing the empty container to be removed from the cradle by a fork lift truck or a hand truck. A full container would be placed on the foot plate 17 and the cycle is repeated.

As will be understood this arrangement avoids the need to mount and dismount the hood from a container externally of the cradle thereby providing a substantial saving in time and effort and substantially speeds up the handling of containers.

What is claimed is:

1. An apparatus for an end-over-end inversion of a container assembly having a box with four sides and a bottom with a demountable discharge hood coupled to the box over an open top of the box, said apparatus comprising:
 a cradle support;
 a cradle for receiving the container assembly, said cradle being formed as a channel with two sides, a bottom and a first channel end and a second channel end, said first channel end being in a fixed position and said second channel end being coupled to said channel via telescopic means for allowing said second channel end to move in a lengthwise direction of said channel between a closed position and an open position;
 means for moving said second channel end;

means for securing said second channel end in said closed position;

aligned stub axles being fixed to said two sides of said channel and engaged in bearings on said cradle support;

drive means coupled to at least one of said aligned stub axles for rotating said cradle end-over-end through 180°, said two sides and said bottom of said channel providing lateral support for the container assembly during an end-over-end inversion, with a distance between said two ends of said channel, when said second channel end is in said closed position, being such that there is substantially no end-to-end movement of the container assembly during inversion.

2. The apparatus for an end-over-end inversion of a container assembly according to claim 1, wherein said cradle includes tracks engaged by wheels on said second channel end.

3. The apparatus for an end-over-end inversion of a container assembly according to claim 1, further comprising lug means fixed to said bottom of said channel at a location remote from said second channel end and extending into said channel, said lug means being positioned to be engaged by actuating means on the demountable discharge hood of the container assembly for the coupling between the demountable discharge hood and the box as the container assembly, with the box resting on said second channel end, is raised relative to said channel.

4. An apparatus for an end-over-end inversion of a container assembly having a box with four sides and a bottom with a demountable discharge hood coupled to the box over an open top of the box, said apparatus comprising:

a cradle support;

a cradle for receiving the container assembly, said cradle being formed as a channel with two sides, a bottom and two channel ends, at least one of said channel ends being movable in a lengthwise direction of said channel between a closed position and an open position, and at least one of said channel ends being coupled to said channel via telescopic means for allowing at least one of said channel ends to move in the lengthwise direction of said channel;

means for moving at least one of said channel ends;

means for securing at least one of said channel ends in said closed position;

aligned stub axles being fixed to said two sides of said channel and engaged in bearings on said cradle support;

drive means coupled to at least one of said aligned stub axles for rotating said cradle end-over-end through 180°, said two sides and said bottom of said channel providing lateral support for the container assembly during an end-over-end inversion, with a distance between said two ends of said channel, when at least one of said channel ends is in said closed position, being such that there is substantially no end-to-end movement of the container assembly during inversion.

5. The apparatus for an end-over-end inversion of a container assembly according to claim 4, wherein said two channel ends are both movable in the lengthwise direction of said channel between said closed position and said open position.

6. The apparatus for an end-over-end inversion of a container assembly according to claim 4, wherein said cradle includes tracks engaged by wheels on said second channel end.

7. The apparatus for an end-over-end inversion of a container assembly according to claim 4, further comprising lug means fixed to said bottom of said channel at a location remote from said second channel end and extending into said channel, said lug means being positioned to be engaged by actuating means on the demountable discharge hood of the container assembly for the coupling between the demountable discharge hood and the box as the container assembly, with the box resting on said second channel end, is raised relative to said channel.

* * * * *